United States Patent
Bakshi

(10) Patent No.: US 10,404,597 B2
(45) Date of Patent: Sep. 3, 2019

(54) VIRTUAL HORIZONTALLY-SCALABLE PACKET BROKER SYSTEMS AND METHODS FOR DISTRIBUTION OF SESSION-BASED NETWORK TRAFFIC

(71) Applicant: Keysight Technologies, Inc., Minneapolis, MN (US)

(72) Inventor: Abhishek Bakshi, West Bengal (IN)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 15/826,787

(22) Filed: Nov. 30, 2017

(65) Prior Publication Data

US 2019/0166049 A1    May 30, 2019

(51) Int. Cl.
*H04L 12/743*    (2013.01)
*H04L 12/24*    (2006.01)

(52) U.S. Cl.
CPC .......... *H04L 45/7453* (2013.01); *H04L 41/22* (2013.01)

(58) Field of Classification Search
CPC .............................. H04L 45/7453; H04L 41/22
See application file for complete search history.

(56) References Cited

U.S. PATENT DOCUMENTS

| | | | |
|---|---|---|---|
| 6,480,488 B1 | 11/2002 | Huang | |
| 7,340,744 B2 | 3/2008 | Chandwadkar et al. | |
| 7,373,412 B2 | 5/2008 | Colas et al. | |
| 7,421,506 B2 | 9/2008 | Ni et al. | |
| 8,270,942 B2 | 9/2012 | Zabawskyj et al. | |
| 8,457,126 B2 | 6/2013 | Breslin et al. | |
| 8,514,756 B1 | 8/2013 | Ramachandra et al. | |
| 8,929,356 B2 | 1/2015 | Pandey et al. | |
| 9,298,560 B2 | 3/2016 | Janakiraman et al. | |
| 9,380,002 B2 | 6/2016 | Johansson et al. | |
| 2008/0031141 A1 | 2/2008 | Lean et al. | |

(Continued)

OTHER PUBLICATIONS

Ixia Network Visibility Solutions, Anue GTP Session Controller 7433, Product Specifications, Document No. 915-6504-01 Rev. B, May 2013, 3 pgs.

(Continued)

*Primary Examiner* — Ronald B Abelson

(57) ABSTRACT

Virtual horizontally-scalable packet broker systems and methods are disclosed for distribution of session-based network traffic. One or more distributors along with a plurality of ingress processors and egress processors are operated within a virtual processing environment to forward session-based network traffic to network tools. The session-based network traffic includes user packets and control packets associated with user sessions. In addition, one or more session controllers are also operated within the virtual processing environment to dynamically control numbers of virtual processing nodes operating as the distributors, the ingress processors, and the egress processors. User packets are processed and distributed by the distributors, ingress processors, and the egress processors. Control packets are processed and distributed by the distributors, session controllers, and egress processors. The egress processors can include initial and secondary egress processors. In one embodiment, the session-based network traffic can be GTP traffic including GTP-C and GTP-U packets.

20 Claims, 6 Drawing Sheets

(56) References Cited

U.S. PATENT DOCUMENTS

| | | |
|---|---|---|
| 2011/0286461 A1 | 11/2011 | Ichino et al. |
| 2012/0082073 A1 | 4/2012 | Andreasen et al. |
| 2012/0236823 A1 | 9/2012 | Kompella et al. |
| 2013/0054761 A1 | 2/2013 | Kempf et al. |
| 2013/0239119 A1* | 9/2013 | Garg .................. G06F 9/46 |
| 2013/0265883 A1 | 10/2013 | Henry et al. |
| 2013/0272136 A1 | 10/2013 | Ali et al. |
| 2015/0172219 A1 | 6/2015 | Johansson et al. |
| 2016/0277321 A1 | 9/2016 | Johansson et al. |

OTHER PUBLICATIONS

Ixia Anue GTP Session Controller, Take Control of GTP Monitoring to Improve Customer QoE and Maximize Network ROI, Solution Brief, Document No. 915-6606-01 Rev. A, Sep. 2013, 2 pgs.

* cited by examiner

VIRTUAL HORIZONTALLY-SCALABLE PACKET BROKER SYSTEMS AND METHODS FOR DISTRIBUTION OF SESSION-BASED NETWORK TRAFFIC

TECHNICAL FIELD

The disclosed embodiments relate to distributing network packets and, more particularly, to distributing user session traffic for network communication systems.

BACKGROUND

Packet-based communication networks continue to grow in importance, and it is often desirable to monitor network traffic associated with these packet-based networks on an ongoing basis. To meet these monitoring needs, copies of network packets can be distributed to diagnostic network monitoring tools. Packets are often forwarded using network hubs, test access ports (TAPs), switched port analyzer (SPAN) ports, and/or other tap devices installed within network communication systems.

Certain network systems also include virtual processing environments hosted by one or more host servers. For example, network applications and resources can be made available to network-connected systems as virtualized resources operating within virtualization layers on host servers. In some embodiments, processors or other programmable integrated circuits associated with a server (e.g., server blade) and/or combinations of such servers operate to provide such virtual resources. These hosted virtual processing can then be made available to network-connected systems and devices.

For certain communication systems, network packets are communicated within network sessions between two or more network nodes. One protocol that is used for network sessions is GTP (GPRS (General Packet Radio Service) Tunneling Protocol). User equipment (UE), such as mobile cellular handsets, can have multiple active sessions at a time that are using GTP communications. To manage these GTP communication sessions, it is often desirable to have visibility into all sessions that are active for a particular UE. As such, network monitoring tools often desire to receive all network packets associated with the active GTP sessions for particular UE. Tracking these active sessions, however, is difficult because sessions are constantly being created and torn down within the network communication system.

GTP packets are often classified by their F-TEID. An F-TEID is a combination of the destination IP address and the tunnel endpoint identifier (TEID) included within the GTP packet. The F-TEID can be used to determine to which user session a GTP packet belongs. However, because F-TEIDs are dynamically allocated and will change over time, an F-TEID can be used by one session for one user and can later be re-used by a different session for a different user. As such, it is difficult over time to determine which packets should be associated with which user sessions based upon F-TEIDs. A GTP session controller (GSC) can be used to identify and track user sessions and related F-TEIDs so that packets associated with a user session can be forwarded to a common network monitoring tool. To achieve this result, a GSC typically receives and analyzes control packets (GTP-C) and user packets (GTP-U) associated with user traffic to track changes to sessions and determine which F-TEIDs are associated with which user.

As the volume of mobile GTP network traffic and/or other session-based traffic increases within networks (e.g., mobile IP (Internet Protocol) traffic), network operators can experience significant difficulty in their ability to monitor this increasing volumes of GTP traffic. As indicated above, GTP traffic can be generally divided into user plane traffic that is carried in GTP-U packets and control plane traffic that is carried in GTP-C packets. Prior GSC solutions receive the GTP-C and GTP-U packets or copies of these packets, apply filtering and sampling rules, and forward these packets to one or more network tools (e.g., billing verification, billing, security, QoS, analytics, etc.). In order to do their job properly, these network tools need to receive all GTP-C and GTP-U packets associated with communication sessions for each particular mobile subscriber user. As the volume of GTP traffic increases, however, traditional GSC solutions can experience performance issues or become less-cost effective due to the increases in GTP traffic volumes. Further, other types of session-based network traffic that has similar user/control planes and related user/control packets have similar problems with increased volumes. For example, in addition to GTP traffic, similar problems can be suffered by other SPP (Signaling Plane Protocol) traffic such as the Diameter protocol traffic, S1-AP (S1 Application Protocol) traffic, NAS (network attached storage) traffic, X2-AP (X2 Application Protocol) traffic, RANAP (Radio Access Network Application Protocol) traffic, and/or other SPP traffic for network packet communications.

SUMMARY

Virtual horizontally-scalable packet broker systems and methods are disclosed for distribution of session-based network traffic. One or more distributors along with a plurality of ingress processors and egress processors are operated within a virtual processing environment to forward session-based network traffic to network tools. The session-based network traffic includes user packets and control packets associated with user sessions. In addition, one or more session controllers are also operated within the virtual processing environment to dynamically control numbers of virtual processing nodes operating as the distributors, the ingress processors, and the egress processors. User packets are processed and distributed by the distributors, ingress processors, and the egress processors. Control packets are processed and distributed by the distributors, session controllers, and egress processors. The egress processors can include initial and secondary egress processors. In one embodiment, the session-based network traffic can be GTP traffic including GTP-C and GTP-U packets. Various embodiments are disclosed and different features and variations can be implemented and utilized.

For one embodiment, a system to distribute session-based network traffic to network tools is disclosed including one or more distributors, a plurality of ingress processors, and plurality of egress processors as well as one or more session controllers, and the session-based network traffic includes user packets and control packets associated with user sessions for a plurality of users. The one or more distributors, a plurality of ingress processors, and plurality of egress processors operate within a virtual processing environment hosted by one or more servers and programmed to forward session-based network traffic to one or more network tools. The one or more session controllers operate within the virtual processing environment and programmed to dynamically control numbers of virtual processing nodes within the virtual processing environment operating as the one or more distributors, the plurality of ingress processors, and the plurality of egress processors. The distributors, ingress processors, and the egress processors are configured to process and distribute the user packets. The distributors, session controllers, and egress processors are configured to process and distribute the control packets.

In additional embodiments, the one or more distributors are further programmed to receive the control packets and the user packets, forward the control packets to the one or more session controllers, and distribute the user packets among the ingress processors; the ingress processors are further programmed to receive the user packets from the one or more distributors, and forward the user packets to egress processors; the one or more session controllers are further programmed to receive the control packets from the one or more distributors, correlate the control packets with the user sessions, and forward the correlated control packets to the egress processors; and the egress processors are further programmed to receive the user packets from the ingress processors, receive the correlated control packets from the one or more session controllers, aggregate the user packets and the correlated control packets to form aggregated packets, and forward the aggregated packets to one or more network tools based upon tool forwarding instructions.

In additional embodiments, the one or more session controllers are further programmed to forward egress forwarding instructions to the ingress processors to determine how user packets are forwarded from the ingress processors to the egress processors and to forward tool forwarding instructions to the egress processors to determine how the user packets and correlate control packets are forwarded from the egress processors to the one or more network tools. In further embodiments, the one or more session controllers are further programmed to allow configuration of the egress forwarding instructions and the tool forwarding instructions through a user interface. In still further embodiments, the egress forwarding instructions are configured to forward user packets associated with a particular user to a common egress processor, and the common egress processor is configured to aggregate user packets and correlated control packets for the particular user.

In additional embodiments, the one or more distributors are further configured to generate hash values based upon one or more parameters extracted from the user packets and to distribute the user packets among the ingress processors based upon the hash values. In further embodiments, the one or more session controllers is further configured to forward instructions to the one or more distributors to determine which ingress processor receives each user packet.

In additional embodiments, the session-based network traffic includes GTP (GPRS (General Packet Radio Service) Tunneling Protocol) traffic; the control packets include GTP-C packets; and the user packets include GTP-U packets. In further embodiments, the one or more distributors are configured to extract a TEID (tunnel endpoint identifier) from the user packets and to distribute the user packets among the ingress processors based upon the TEIDs.

In additional embodiments, the one or more session controllers are further programmed to send information to the one or more distributors identifying a number of ingress processors operating in the virtual processing environment, and the one or more distributors are further programmed to use the number of ingress processors to distribute the user packets among the ingress processors.

In additional embodiments, the egress processors include initial egress processors and secondary egress processors such that the initial egress processors are programmed to forward the aggregated packets to the secondary egress processors based upon secondary egress forwarding instructions and such that the secondary egress processors are configured to receive the tool forwarding instructions. In further embodiments, the secondary egress processors are programmed to group the aggregated packets based upon one or more packet identifiers and to forward the grouped aggregated packets to the one or more network tools based upon the tool forwarding instructions. In still further embodiments, the one or more packet identifiers include information extracted from at least one of the user packets or the control packets. In additional further embodiments, the one or more packet identifiers include at least one of an APN (access point name) identifier, a network address identifier, or an application identifier.

For one embodiment, a method to distribute session-based network traffic to network tools is disclosed including operating one or more distributors, a plurality of ingress processors, and plurality of egress processors within a virtual processing environment hosted by one or more servers to forward session-based network traffic to one or more network tools where the session-based network traffic includes user packets and control packets associated with user sessions for a plurality of users. The method also includes operating one or more session controllers within the virtual processing environment to dynamically control numbers of virtual processing nodes within the virtual processing environment operating as the one or more distributors, the plurality of ingress processors, and the plurality of egress processors. The method further includes processing and distributing the user packets with the distributors, ingress processors, and the egress processors and includes processing and distributing the control packets with the distributors, session controllers, and egress processors.

In additional embodiments, the method further includes with the one or more distributors receiving the control packets and the user packets, forwarding the control packets to the one or more session controllers, and distributing the user packets among the ingress processors; further includes with the ingress processors receiving the user packets from the one or more distributors and forwarding the user packets to egress processors; further includes with the one or more session controllers receiving the control packets from the one or more distributors, correlating the control packets with the user sessions, and forwarding the correlated control packets to the egress processors; and further includes with the egress processors receiving the user packets from the ingress processors, receiving the correlated control packets from the one or more session controllers, aggregating the user packets and the correlated control packets to form aggregated packets; and forwarding the aggregated packets to one or more network tools based upon tool forwarding instructions.

In additional embodiments, the method further includes with the one or more session controllers forwarding egress forwarding instructions to the ingress processors to determine how user packets are forwarded from the ingress processors to the egress processors and forwarding tool forwarding instructions to the egress processors to determine how the user packets and correlate control packets are forwarded from the egress processors to the one or more network tools. In further embodiments, the egress forwarding instructions are configured to forward user packets associated with a particular user to a common egress processor, and the common egress processor is configured to aggregate user packets and correlated control packets for the particular user.

In additional embodiments, the session-based network traffic includes GTP (GPRS (General Packet Radio Service)

Tunneling Protocol) traffic, the control packets include GTP-C packets, and the user packets include GTP-U packets.

In additional embodiments, the egress processors include initial egress processors and secondary egress processors, and the method further includes with the initial egress processors forwarding the aggregated packets to the secondary egress processors based upon secondary egress forwarding instructions and further includes with the secondary egress processors grouping the aggregated packets based upon one or more packet identifiers and forwarding the grouped aggregated packets to the one or more network tools based upon the tool forwarding instructions.

Different or additional features, variations, and embodiments can be implemented, if desired, and related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION

Virtual horizontally-scalable packet broker systems and methods are disclosed for distribution of session-based network traffic. Disclosed embodiments provide for distribution of session-based packet traffic, such as is GTP (GPRS (General Packet Radio Service) Tunneling Protocol) traffic and/or other signaling type traffic, through session controllers that dynamically control numbers of virtual processing nodes operating within virtual processing environments hosted on one or more servers. In addition to the session controllers, the processing nodes for the virtual session packet broker embodiments include distributors, ingress processors, and egress processors that operate together to distribute session-based traffic to one or more network tools. Various embodiments are disclosed and different features and variations can be implemented and utilized.

The embodiments described herein provide methods and systems to achieve horizontal scaling in the distribution, correlation, and segregation of session-based network traffic in a virtual processing environment. The disclosed embodiments thereby achieve high throughput processing and flexibly scaling of packet brokering for session-based traffic, such as GTP traffic, without being limited or restricted by the processing, memory, and/or other resources of a single virtual processing node or function. The virtual session packet broker embodiments described herein can also operate within a network communication system that is implemented using VNFs (virtual network functions). In operation, VNFs are responsible for handling specific network functions through platforms running on one or more virtual machines or other virtualization layers on top of hardware infrastructure, and the VNF can perform network functions normally associated with hardware network devices such as routers, switches, servers, and/or other network devices. As such, VNFs provide flexibility by allowing network functions to be implemented in virtualization layers that run on top of underlying hardware.

Figure 1:
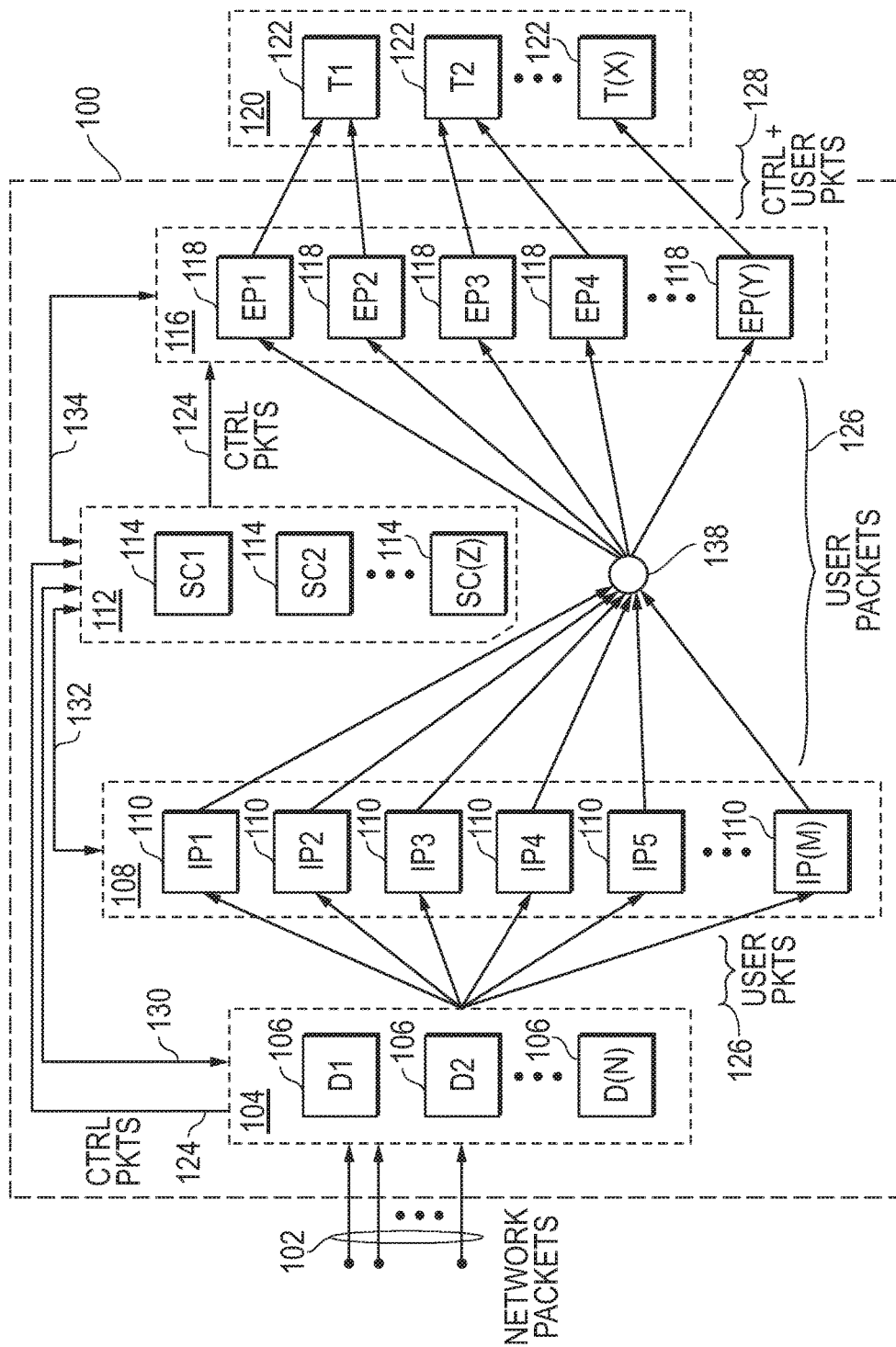
FIG. 1 is a block diagram of an example embodiment for a session packet broker operating as dynamically managed processing nodes within a virtual processing environment to receive and process network packets and then forward these network packets to one or more monitoring tools.

FIG. 1 is a block diagram of an example embodiment for a session packet broker 100 operating as dynamically managed processing nodes within a virtual processing environment to receive and process network packets 102 and then forward these network packets 102 to one or more monitoring tools 122. The virtual processing nodes for the session packet broker 100 includes a cluster 104 of one or more distributors 106, a cluster 108 of a plurality of ingress processors 110, a cluster 112 of one or more session controllers 114, a cluster 116 of a plurality of egress processors 118, and a cluster of one or more monitoring tools 122. As described herein, the clusters 104, 108, 112, 116, and 120 can be implemented, for example, as clustered processing nodes with one or more virtual processing environments hosted by one or more servers. The processing nodes can be, for example, virtual machines operating within a hypervisor running on one or more servers, container engines running on one or more servers, and/or other processing nodes operating within virtualization layers for hosted virtual processing environments. The number of individual processing nodes within each cluster 104, 108, and 116 are dynamically controlled by one or more of the session controllers 114 through cluster control commands communicated through messages 130, 132, and 134, respectively. The number of session controllers 114 within the cluster 112 can be dynamically controlled by one of the session controllers 114 operating as a master session controller.

The one or more distributors (D1, D2 . . . D(N)) 106 operate to receive network packets 102 including packet traffic from user sessions or copies of network packets from user sessions. The packet traffic can be associated with mobile network users, and the packets can be communicated using one or more session-based packet protocols and can include user packets and separate control packets. The session-based packet protocols can include, for example, protocols such as GTP and/or other session-based packet protocols such as signaling plane protocol (SPPs) such as the Diameter, S1-AP (S1 Application Protocol), NAS (network attached storage) protocols, X2-AP (X2 Application Protocol), RANAP (Radio Access Network Application Protocol), and/or other signaling plane protocols. The distributors 106 identify control packets (e.g., GTP-C packets in GTP communications) within the received network packets 102 and then forwards these control packets 124 to a session controllers 114. The distributors 106 also identify user packets (e.g., GTP-U packets in GTP communications) within the received network packets 102 and then distributes these user packets 126 to the ingress processors 110.

In one embodiment, the one or more distributors 106 use information extracted from each of the control packets 124 within the network packets 102 to determine which of the one or more session controllers 114 will receive that control packet. For example, where GTP network communications are used, information extracted form GTP-C packets are evaluated and used to make this determination. The extracted information can be any desired information including TEIDs (tunnel endpoint identifiers), source IP addresses, destination IP addresses, and/or other data extracted from the GTP-C packets. Further, a hashing function can also be applied to the information extracted from each control packet, and the resulting hash value can be used by the one or more distributors 106 to determine which of the one or more session controllers 114 will receive that control packet. Through this use of extracted information to determine distribution destinations for control packets, the one or more distributors 106 provide load balancing of packet processing loads for the one or more session controllers 114. It is further noted that the one or more session controllers 114 can be configured to provide the one or more distributors 106 information through messages 130 concerning the number of session controllers 114, their address identifiers (e.g., IP address), and/or other desired information to facilitate the distribution of the control packets 124.

Similarly, the one or more distributors 106 use information extracted from each of the user packets 126 within the network packets 102 to determine which of the plurality of ingress processors 110 will receive that user packet. For example, where GTP network communications are used, information extracted form GTP-U packets are evaluated and used to make this determination. The extracted information can be any desired information including TEIDs (tunnel endpoint identifiers), source IP addresses, destination IP addresses, and/or other data extracted from the GTP-U packets. Preferably, for GTP-U packets, only TEIDs are used as the extracted information to determine which of the ingress processors 110 receive each of the user packets 126. Further, a hashing function can also be applied to the information extracted from each control packet, and the resulting hash value can be used by the one or more distributors 106 to determine which of the ingress processors 110 will receive that user packet. Through this use of extracted information to determine distribution destinations for user packets, the one or more distributors 106 provide load balancing of packet processing loads for the plurality of ingress processors 110. It is further noted that the one or more session controllers 114 can be configured to provide the one or more distributors 106 information through messages 130 concerning the number of ingress processors 110, their address identifiers (e.g., IP address), and/or other desired information to facilitate the distribution of the user packets 126.

In one embodiment for virtual processing environments, the number of distributors 106 and related output ports operating in cluster 104 is controlled based upon information from the session controllers 114 concerning the number of ingress processors 110 within cluster 108. If more are needed based upon instructions from the session controllers 114, the cluster 104 starts additional virtual processing nodes to operate as additional distributors 106. If fewer are needed, the cluster 104 stops one or more virtual processing nodes currently operating as distributors 106. Further, the cluster 104 of distributors 106 can also provide information to the cluster 112 of session controllers 114 concerning the distribution mapping being used to assign and distribute control packets 124 and/or user packets 126. The cluster 112 of session controllers 114 can then use this information to adjust the number of ingress processors 110 within cluster 108 and/or for other purposes such as internally adjusting the number of session controllers 114 within the cluster 112.

The one or more session controllers (SC1, SC2 ... SC(Z)) 114 operate to receive and analyze the control packets 124 in order to identify and track user sessions as well as to correlate the control packets 124 with user sessions and related user packets 126. For example, each session controller 114 parses the control packets 124 it receives, correlates them to user sessions, updates session information stored within the session packet broker 100, and sends the control packets to the egress processor 118 that handles the flow of the particular user associated with the correlated control packet. For GTP communications, the session controllers 114 receive and analyze GTP-C packets to identify and track user sessions and to correlate the GTP-C packets to GTP-U packets for a particular user or UE (user equipment) communicating within the network. The one or more session controllers 114 can also operate to determine uplink (UL) and downlink (DL) tunnel endpoint identifiers (TEIDs) for bearers associated with the UE communications.

In one embodiment, the session controllers 114 operate to control the operations of the session packet broker 100 through control information communicated through messages 130, 132, and 134 to the distributors 106, the ingress processors 110, and the egress processors 118, respectively. For example, the session controllers 114 can send control information to adjust the numbers of virtual processing nodes operating as distributors 106 within cluster 104, the number virtual processing nodes operating as ingress processors 110 within cluster 108, and the number of virtual processing nodes operating as egress processors 118 within cluster 116.

In one embodiment, the session controllers 114 send egress forwarding instructions through messages 132 to the ingress processors 110 that are applied to determine which of the plurality of egress processors 118 receive user packets processed by the ingress processors 110. For example, each ingress processor 110 can apply ingress filter rules based upon the egress forwarding instructions it receives through messages 132 to one or more ingress filter engines for that ingress processor 110 to determine how user packets it receives are forwarded to the one or more egress processors 118. Preferably, these ingress filter rules are applied to select one of the egress processors 118 as a common egress processor to receive the packet flows for sessions associated with a particular user's traffic. Similarly, the session controllers 114 send tool forwarding instructions through messages 134 to the egress processors 118 to determine which of the tools (T1, T2 ... T(X)) 122 receive user packets 126 and correlated control packets 124 processed by the egress processors 118. For example, each egress processor 118 can apply egress filter rules based upon tool forwarding instructions it receives through messages 134 to one or more egress filter engines for that egress processor 118 to determine how control and user packets it receives are forwarded to the one or more tools 122. For a further embodiment, the egress and tool forwarding instructions are configured at least in part based upon user inputs received through a user interface, such as a command line interface (CLI) and/or graphical user interface (GUI), provided by the session packet broker 100 through the session controllers 114. In addition, the ingress/egress filter rules applied to the ingress/egress filter engines can rely upon information within the user packets 126 and/or control packets 124 to provide the filter forwarding determinations, such as forwarding decisions based upon source IP address (SrcIP), destination IP address (DstIP), TEID, and/or other desired information from the packets 124/126.

The plurality of ingress processors (IP1, IP2, IP3, IP4, IP5 . . . IP(M)) 110 operate to receive the user packets 126 form the distributors 106 and to forward these user packets 126 to particular egress processors 118 based upon egress forwarding instructions received from the one or more session controllers 114. In one embodiment, as represented by central switching fabric 138, any of the ingress processors 110 can forward user packets 126 to any of the egress processors 118. For other embodiments, one or more groups of ingress processors 110 can also be assigned to one or more groups of egress processors 118. As described above, the ingress processors 110 receive egress forwarding instructions through messages 132 from the session controllers 114, and these egress forwarding instructions are applied as filter rules to determine how the user packets 126 received by each of the ingress processors 110 are forwarded to the egress processors 118. In one embodiment, the ingress processors 110 also analyze the user packets 126 to generate flow statistics and/or metrics for the user packets 126, and these flow statistics and/or metrics are reported to the one or more session controllers 114. In one embodiment as described above, the number of processing nodes within cluster 108 operating as ingress processors 110 is determined by the session controllers 114 through control information sent through messages 132 to the cluster 108.

The plurality of egress processors (EP1, EP2, EP3, EP4 . . . EP (Y)) 118 operate to receive the user packets 126 from the ingress processors 110, to receive the correlated control packets 124 from the session controllers 114, to aggregate the user packets 126 with the correlated control packets 124, and to forward the aggregated control/user packets 128 to the one or more network tools (T1, T2 . . . T(X)) 122. As described above, the egress processors 118 receive tool forwarding instructions through messages 134 from the session controllers 114, and these tool forwarding instructions are applied as filter rules to determine how the aggregated control/user packets 128 are forwarded to the network tools 122. Where GTP communications are used, the egress processors 118 receive GTP-U packets from the ingress processors 110, receive GTP-C packets from the session controllers 114 that are correlated to particular users, aggregate the GTP-U packets with their correlated GTP-C packets, and then forward aggregated GTP-U/GTP-C packets to the network tools 122 based upon the tool forwarding instructions received through messages 134. Each of the egress processors 118 can forward aggregated control/user packets 128 for a particular user to a single tool 122 or to multiple tools 122 depending upon the tool forwarding instructions received in messages 134. In one further embodiment, the egress processors 118 also analyze the user packets 126 and/or control packets 124 to generate flow statistics and/or metrics, and these flow statistics and/or metrics are reported to the one or more session controllers 114. In one embodiment as described above, the number of processing nodes within cluster 116 operating as egress processors 118 is determined by the session controllers 114 through control information sent through messages 134 to the cluster 116.

In one embodiment, the distribution of packets 124/126 from the distributors 106 to the ingress processors 110 and/or to the session controllers 114 is performed using a tunneling mechanism such as GRE (generic routing encapsulation), L2TP (layer 2 tunneling protocol), and/or another tunneling protocol. In one embodiment, the forwarding of user packets 126 from the ingress processors 110 to the egress processors 118 is performed using a tunneling mechanism such as GRE (generic routing encapsulation), L2TP (layer 2 tunneling protocol), and/or another tunneling protocol. In one embodiment, the forwarding of control packets 124 from the session controllers 114 to the egress processors 118 is performed using a tunneling mechanism such as GRE (generic routing encapsulation), L2TP (layer 2 tunneling protocol), and/or another tunneling protocol. In one embodiment, the forwarding of aggregated control/user packets 128 from the egress processors 118 to the tools 122 is performed using a tunneling mechanism such as GRE (generic routing encapsulation), L2TP (layer 2 tunneling protocol), and/or another tunneling protocol. Other packet distribution or forwarding processes could also be used while still taking advantage of the session packet broker techniques described herein.

Figure 2:
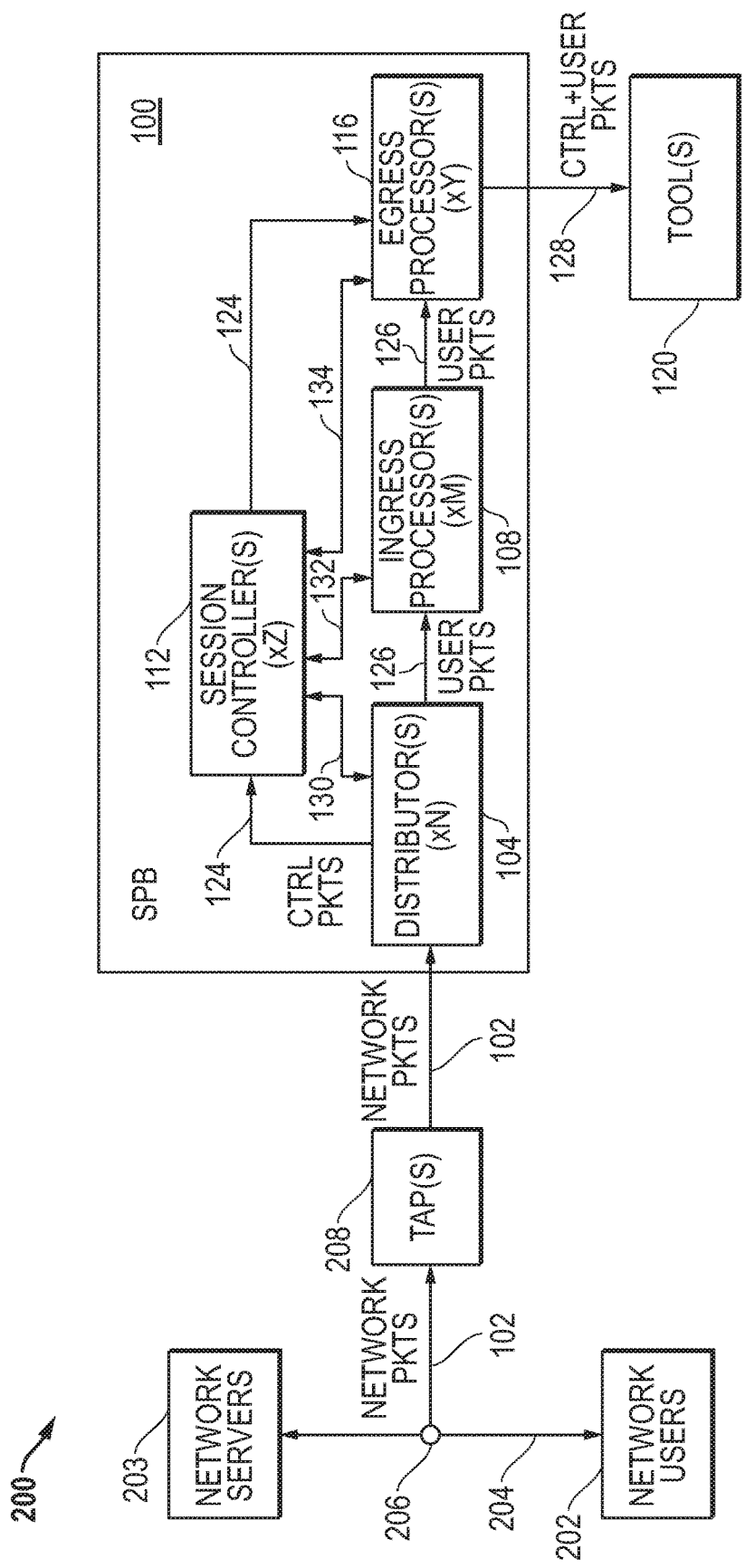
FIG. 2 is a block diagram of an example embodiment for the session packet broker within a network communication system including network users and network servers.

FIG. 2 is a block diagram of an example embodiment 200 for the session packet broker 100 within a network communication system 200 including network users 202 and network servers 203. As the network users 202 communicate with the network servers 203, user sessions are created and torn down over time, and each user can be associated with one or more user sessions. The session packets 204 include user packets and control packets that are communicated between the network users 202 and the network servers 203 while the user sessions are active. In one embodiment, the network users 202 are mobile UE (user equipment) devices that communicate with the network servers 203 using GTP, and GTP-C and GTP-U packets are included within the session packets 204.

For monitoring of the session packets 204, one or more tap devices 208 monitor the session packets at one or more monitoring points, as represented by node 206. Copies of the session packets 204 are received by the tap devices 208 as network packets 102, and these network packets 102 are forwarded to the session packet broker (SPB) 100. As described above for one embodiment, the session packet broker 100 is implemented in a virtual processing environment and includes a cluster 104 of processing nodes operating as distributors (e.g., N different nodes), a cluster 108 of processing nodes operating as ingress processors (e.g., M different nodes), a cluster 116 of processing nodes operating as egress processors (e.g., Y different nodes), and a cluster 112 of processing nodes operating as session controllers (e.g., Z different nodes). The distributor cluster 104 parses the network packets 102, sends control packets 124 to the session controller cluster 112, and sends user packets 126 to the ingress processor cluster 108. The egress processor cluster 116 receives user packets from the ingress processor cluster 108 and aggregates them with correlated control packets 124 from the session controller cluster 112. The egress processor cluster 116 then forwards the aggregated control/user packets 128 to the monitoring tools, which can also be a cluster 120 of processing nodes operating as monitoring tools. The session controller cluster 112 uses cluster control commands transmitted through messages 130, 132, and 134 to dynamically manage the number of processing nodes operating in the clusters 104, 108, and 116 as well as to provide forwarding instructions and/or other control information that determines how packets are forwarded through the session packet broker 100 and ultimately distributed to the network tools 122.

Figure 3:
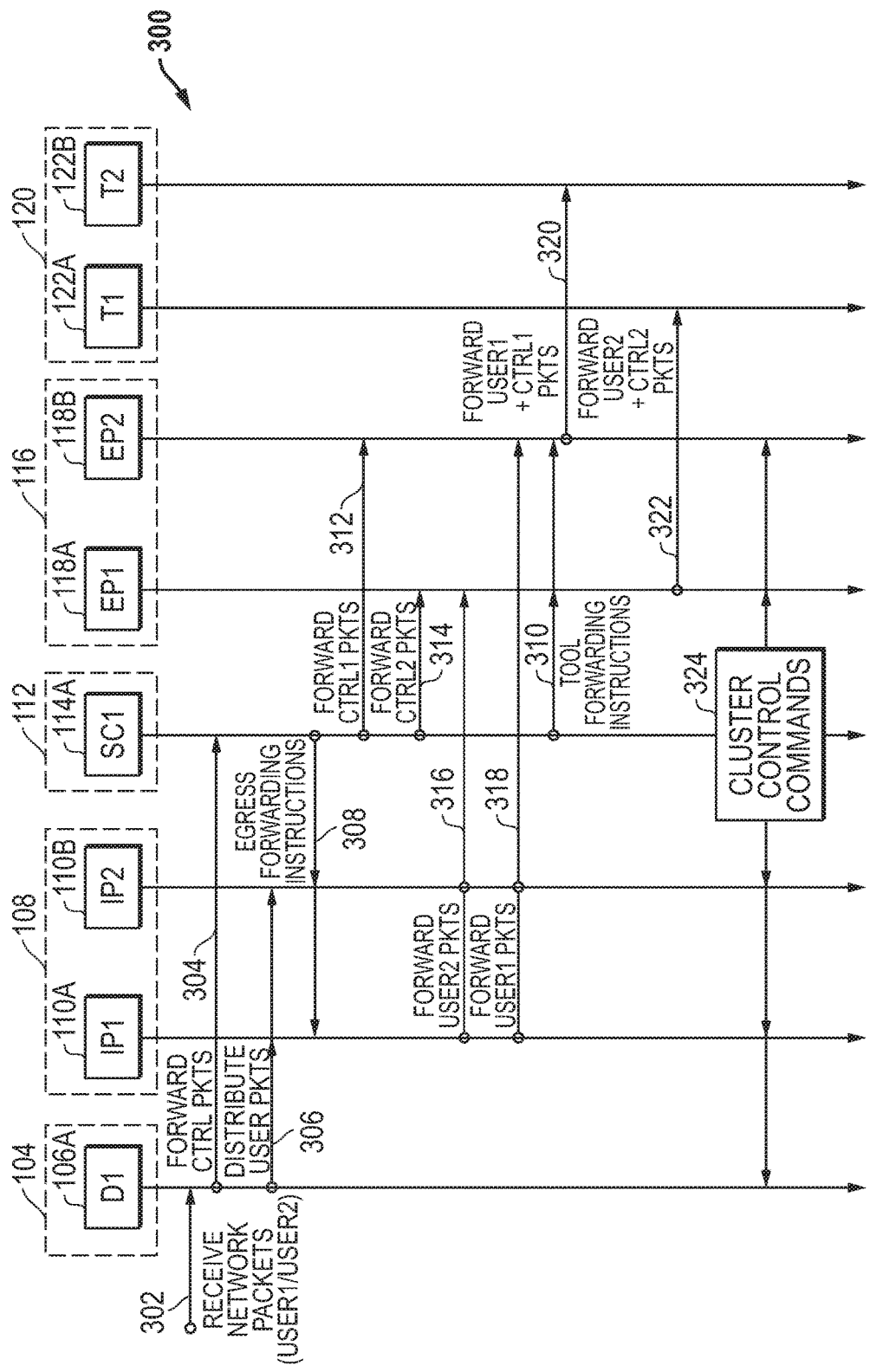
FIG. 3 is a swim lane diagram of an example embodiment for the processing of network packets from session traffic by the session packet broker.

FIG. 3 is a swim lane diagram of an example embodiment 300 for the processing of network packets from session traffic by a session packet broker. For the example embodiment 300, the processing of packets is shown for one distributor (D1) 106A within cluster 104, one session controller (SC1) 114A within cluster 112, two ingress processors (IP1, IP2) 110A/110B within cluster 108, two egress processors (EP1, EP2) 118A/118B within cluster 116, and two tools (T1, T2) 122A/122B within cluster 120. Additional and/or different numbers of processing nodes could be used while still taking advantage of the session packet broker techniques described herein. In one embodiment, the session controller 114A uses cluster control commands transmitted to the clusters 104, 108, and 116 to dynamically manage the number of processing nodes operating in those clusters as indicated by block 324.

Initially, the network packets are received by the distributor 106A as indicated by arrow 302. These network packets are assumed to include session packets for a first user (USER1) and a second user (USER2) communicating within the network communication system. The distributor 106A parses the network packets and forwards control packets to the session controller 114A as indicated by arrow 304. The distributor 106A also distributes the user packets among the ingress processors 110A and 110B. For example as described above, information can be extracted from the user packets and/or the control packets and applied to a distribution algorithm (e.g., hashing function) to determine how the user packets and/or the control packets are distributed.

The session controller 114A receives the control packets from the distributor 106A and analyzes these control packets to identify users and related user sessions and thereby correlate the control packets to user sessions. The session controller 114A then sends correlated control packets for the second user (CTRL2) to the egress processor 118A as indicated by arrow 314. Similarly, the session controller 114A sends correlated control packets for the first user (CTRL1) to the egress processor 118B as indicated by arrow 312.

The session controller 114A provides egress forwarding instructions to the ingress processors 110A and 110B as indicated by arrow 308 to determine how user packets are to be forwarded to the egress processors 118A and 118B. The ingress processors 110A and 110B receive and apply these forwarding instructions, for example, by applying the ingress filter rules to ingress filter engines to determine how the user packets are forwarded. Preferably, the ingress filter rules are configured to send packets associated with sessions for a particular user to the same egress processor. For embodiment 300, the ingress processors 110A and 110B apply the ingress filter rules to forward packets associated with sessions for the first user (USER1) to egress processor 118B as indicated by arrow 318. Similarly, the ingress processors 110A and 110B apply the ingress filter rules to forward packets associated with sessions for the second user (USER2) to egress processor 118A as indicated by arrow 316.

After receiving the user session packets and the correlated control packets for the first user, the egress processor 118B aggregates the control packets for the first user (CTRL1) with the user session packets for the first user (USER1). After receiving the user session packets and the correlated control packets for the second user, the egress processor 118A aggregates the control packets for the second user (CTRL2) with the user session packets for the second user (USER2).

The session controller 114A provides tool forwarding instructions to the egress processors 118A and 118B as indicated by arrow 310 to determine how aggregated control/user packets are to be forwarded to the tools 122A and 122B. The egress processors 118A and 118B receive and apply these forwarding instructions, for example, by applying the egress filter rules to egress filter engines to determine how the aggregated control-plus-user packets are forwarded. For embodiment 300, the egress processor 118A applies the egress filter rules to forward aggregated packets associated with the first user (USER1+CTRL1) to tool 122B as indicated by arrow 320. The egress processor 118B applies the egress filter rules to forward aggregated packets associated with the second user (USER2+CTRL2) to tool 122A as indicated by arrow 322.

Figure 4:
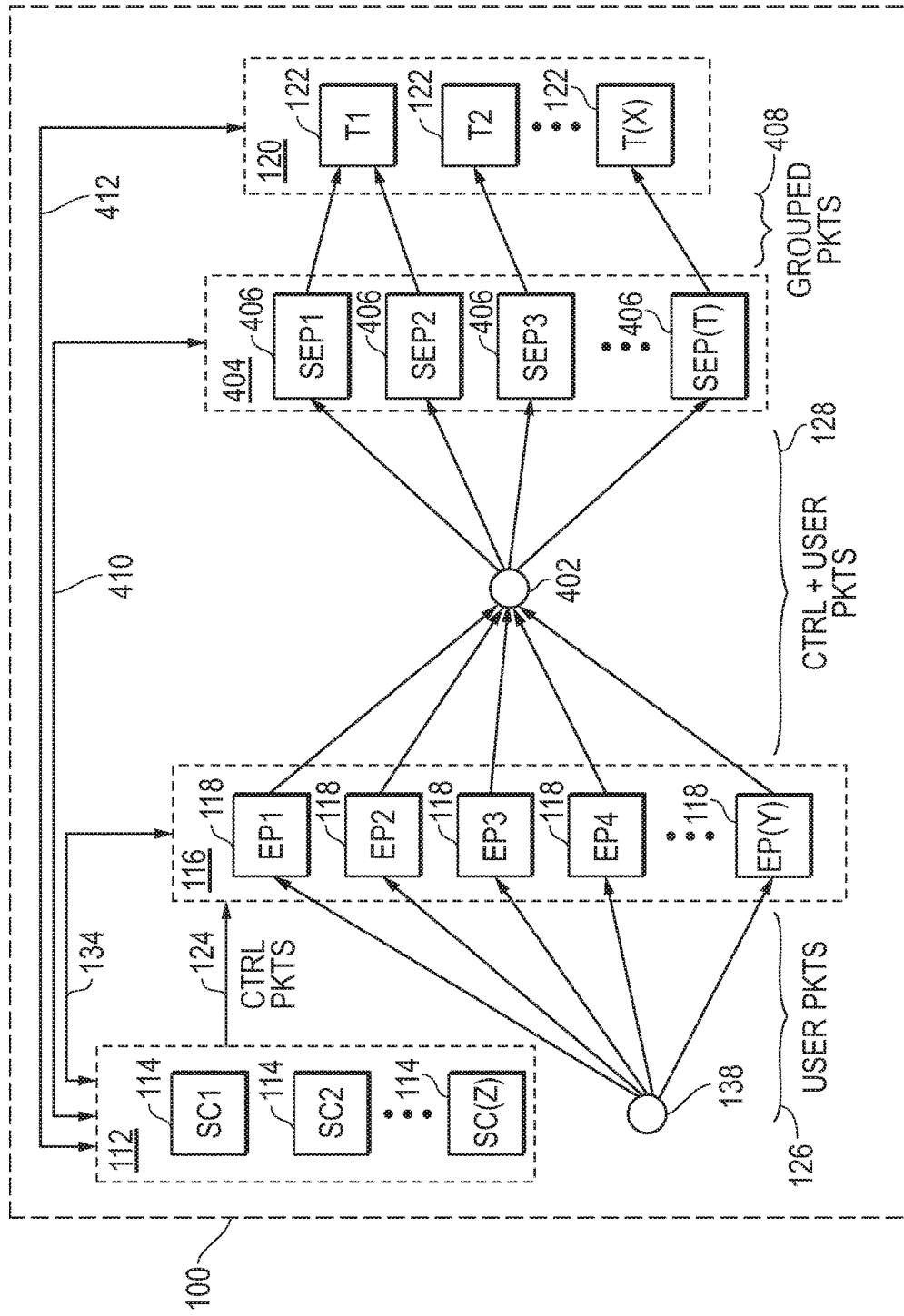
FIG. 4 is a block diagram of an example embodiment for a session packet broker that uses a cluster of secondary egress processors in addition to initial egress processors to provide further grouping of packets being forward to network tools.

FIG. 4 is a block diagram of an example embodiment for a session packet broker 100 that uses a cluster 404 of secondary egress processors 406 in addition to initial egress processors 118 to provide further grouping of packets being forward to network tools 122. The cluster 404 can be implemented, for example, as clustered processing nodes within virtual processing environments. The processing nodes can be, for example, virtual machines operating within a hypervisor running on one or more servers, container engines running on one or more servers, and/or other processing nodes operating within a virtual processing environment. The number of individual processing nodes within the cluster 404 is dynamically controlled by one or more of the session controllers 114 through cluster control commands communicated through messages 410. In one embodiment, the number of individual processing nodes within the cluster 120 of tools 122 is also dynamically controlled by one or more of the session controllers 114 through cluster control commands communicated through messages 412.

Similar to the embodiment of FIG. 2, the plurality of initial egress processors (EP1, EP2, EP3, EP4 . . . EP (Y)) 118 operate to receive the user packets 126 from the ingress processors 110, to receive the correlated control packets 124 from the session controllers 114, and to aggregate the user packets 126 with the correlated control packets 124. For the embodiment of FIG. 4, the egress processors 118 forward the aggregated control/user packets 128 to a plurality of secondary egress processors (SEP1, SEP2, SEP3 SEP(T)). Similar to FIG. 2 above, the egress processors 118 receive forwarding instructions through messages 134 from the session controllers 114. For the embodiment of FIG. 4, however, these forwarding instructions are secondary egress forwarding instructions that determine how the aggregated control/user packets 128 are forwarded to the secondary egress processors 406. Where GTP communications are used, the egress processors 118 receive GTP-U packets from the ingress processors 110, receive GTP-C packets from the session controllers 114 that are correlated to particular users, aggregate the GTP-U packets with their correlated GTP-C packets, and then forward aggregated GTP-U/GTP-C packets to the secondary egress processors 406 based upon the secondary egress forwarding instructions received through messages 134. Each of the egress processors 118 can forward aggregated control/user packets 128 for a particular user to a single secondary egress processor 406 or to multiple secondary egress processors 406 depending upon the forwarding instructions received in messages 134.

For the embodiment of FIG. 4, the secondary egress forwarding instructions provided to the initial egress processors 118 through messages 134 are configured to group the aggregated control/user packets 128 based upon one or more packet identifiers. In operation, the initial egress processors 118 analyze the aggregated control/user packets 128 to determine the existence of one or more of these packet identifiers and then to forward the control/user packets 128 to the secondary egress processors 406 based upon these packet identifiers. As such, groups of aggregated control/user packets 128 can be identified and sent to common secondary egress processors 406. In one embodiment, as represented by central switching fabric 402, any of the initial egress processors 118 can forward aggregated control/user packets 128 to any of the secondary egress processors 406. For other embodiments, one or more groups of egress processors 118 can also be assigned to one or more groups of secondary egress processors 406. In one embodiment, the packet identifiers are based upon information extracted from at least one of the user packets or the control packets, such as for example, an APN (access point name) identifier, a network address identifier, an application identifier, and/or other parameters extracted from these packets.

The plurality of secondary egress processors (SEP1, SEP2, SEP3, . . . EP (T)) 406 operate to receive the aggregated control/user packets 128 from the egress processors 118, to group these packets based upon tool forwarding instructions received from messages 410, and to forward the grouped packets 408 to the one or more network tools (T1, T2 . . . T(X)) 122. The secondary egress processors 406 now receive the tool forwarding instructions rules through messages 410 from the session controllers 114, and these tool forwarding instructions are applied to determine how the grouped packets 408 are forwarded to the network tools 122. Where GTP communications are used, the secondary egress processors 406 forward grouped GTP-U/GTP-C packets to the network tools 122 based upon the forwarding instructions received through messages 410. Each of the secondary egress processors 406 can forward grouped packets 408 to a single tool 122 or to multiple tools 122 depending upon these forwarding instructions received in messages 410. In one further embodiment, the secondary egress processors 406 also analyze the grouped packets 408 to generate flow statistics and/or metrics, and these flow statistics and/or metrics are reported to the one or more session controllers 114. In one embodiment as described above, the number of processing nodes within cluster 404 operating as secondary egress processors 406 is determined by the session controllers 114 through control information sent through messages 410 to the cluster 404.

In one embodiment, the forwarding of aggregated control/user packets 128 from the egress processors 118 to the secondary egress processors 406 is performed using a tunneling mechanism such as GRE (generic routing encapsulation), L2TP (layer 2 tunneling protocol), and/or another tunneling protocol. In one embodiment, the forwarding of grouped packets 408 from the secondary egress processors 406 to the monitoring tools 122 is performed using a tunneling mechanism such as GRE (generic routing encapsulation), L2TP (layer 2 tunneling protocol), and/or another tunneling protocol. Other packet distribution or forwarding processes could also be used while still taking advantage of the session packet broker techniques described herein.

In one embodiment, the grouped packets 408 forwarded by the secondary egress processors 406 can be based upon one or more packet identifiers associated with the control packets 124 and/or user packets 126. For example, the packet identifiers can be based upon information extracted from the control packets 124, the user packets 126, or from both the control and user packets 124/126. For example, the packet identifiers can include one or more of the following: APN (access point name) identifier, a network address identifier, an application identifier, and/or information extracted from these packets. Where GTP communications are used for the session-based network traffic, the session controllers 114 can extract information from GTP-C packets received from the distributors 104 and use this extracted information as one or more packet identifiers. These packet identifiers can then be communicated to the initial egress processors 118 in egress forwarding instructions communicated through messages 134 and communicated to the secondary egress processors 406 in tool forward instructions communicated through the messages 410. In further embodiments, the session controllers 114 can also receive information extracted from user packets 126 to determine packet identifiers for grouping of packets. For example, this information can be extracted from user packets 126 by the distributors 106, ingress processors 110, egress processors 118, and/or secondary egress processors 406 and then forwarded to the session controllers 114 through messages 130, 132, 134, and/or 410, respectively. Other variations could also be implemented.

Figure 5:
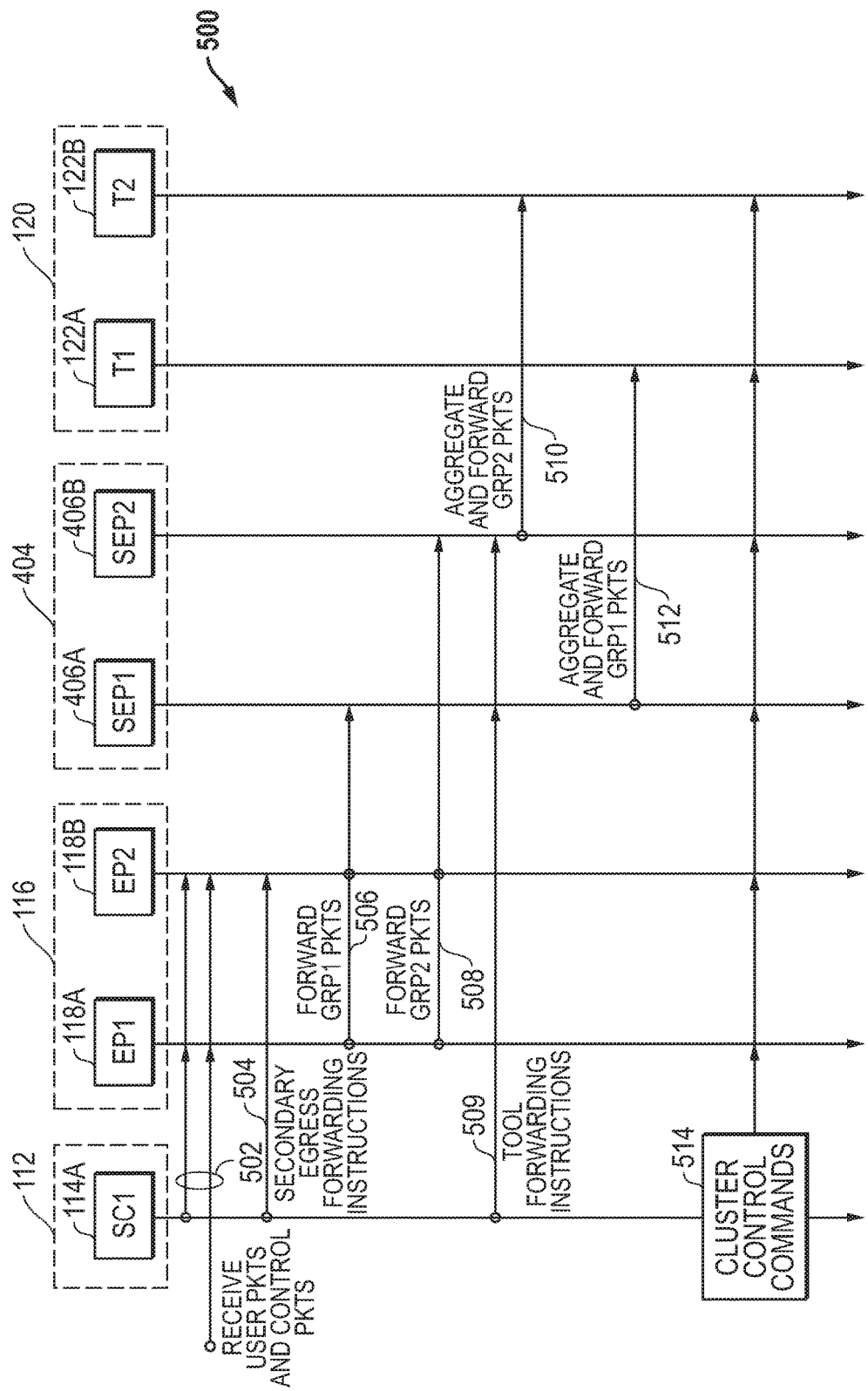
FIG. 5 is a swim lane diagram of an example embodiment for the processing of control packets and user packets using initial egress processors and secondary egress processors.

FIG. 5 is a swim lane diagram of an example embodiment 500 for the processing of control packets and user packets using egress processors and secondary egress processors. For the example embodiment 500, the processing of packets is shown for one session controller (SC1) 114A within cluster 112, two egress processors (EP1, EP2) 118A/118B within cluster 116, two secondary egress processors (SEP1, SEP2) 406A/406B within cluster 404, and two tools (T1, T2) 122A/122B within cluster 120. Additional and/or different numbers of processing nodes could be used while still taking advantage of the session packet broker techniques described herein. In one embodiment, the session controller 114A uses cluster control commands transmitted to the clusters 116, 404, and 120 to dynamically manage the number of processing nodes operating in those clusters as indicated by block 514.

Initially, user packets 126 from the ingress processors 110, as described above, and correlated control packets 124 from the session controller (SC1) 114A are received by the egress processors 118A and 118B as indicated by arrow 502. Further, as described above the egress processors 118A/118B aggregate the user packets and correlated control packets. For the embodiment 500, the session controller 114A provides secondary egress forwarding instructions to the initial egress processors 118A and 118B as indicated by arrow 504 to determine how aggregated control/user packets 128 are to be forwarded to the secondary egress processors 406A and 406B. The egress processors 118A and 118B receive and apply these forwarding instructions, for example, by applying the egress filter rules to egress filter engines to determine how the aggregated control/user packets are forwarded. Preferably, the egress filter rules are configured to send packets associated with identified groups to the same secondary egress processor. For embodiment 300, the egress processors 118A and 118B apply the egress filter rules to forward packets associated with a first group (GRP1) to secondary egress processor 406A as indicated by arrow 506 and to forward packets associated with a second group (GRP2) to secondary egress processor 406B as indicated by arrow 508.

The session controller 114A provides tool forwarding instructions to the secondary egress processors 406A and 406B as indicated by arrow 509 to determine how grouped packets are to be forwarded to the tools 122A and 122B. The secondary egress processors 406A and 406B receive and apply these tool forwarding instructions, for example, by applying the egress filter rules to egress filter engines to determine how the grouped packets are forwarded. For embodiment 500, the secondary egress processor 406A applies the tool forwarding instructions to forward packets associated with the first group (GRP1) to tool 122A as indicated by arrow 512. The secondary egress processor 406B applies the tool forwarding instructions to forward packets associated with the second group (GRP2) to tool 122B as indicated by arrow 510.

It is noted that the hashing function for distribution of the control packets 124 and/or the user packets 126 can be implemented using a distributed hash function or table that associates hash values with session controllers 114 and/or ingress processors 110, respectively. The incoming session-based network traffic 102 is distributed using this distributed hash function or table. It is further noted that the ingress processors 110 can be implemented to store local flow tables that determine how received user packets 126 are forwarded to the egress processors 118, and records within these local flow tables can be created and updated based upon messages 132 from the session controllers 112. Similarly, the egress processors 118 can be implemented to store local flow tables that determine how received aggregated control/user packets 128 are forwarded to the secondary egress processors 406, and records within these local flow tables can be created and updated based upon messages 134 from the session controllers 112. Other variations could also be implemented while still taking advantage of the embodiments described herein.

It is further noted that the cluster 104 of one or more distributors 106, the cluster 108 of a plurality of ingress processors 110, the cluster 112 of one or more session controllers 114, the cluster 116 of a plurality of egress processors 118, the cluster 404 of a plurality of secondary egress processors 406, the cluster 120 of one or more monitoring tools 122, and/or other processing nodes or components described herein can be implemented using one or more programmable integrated circuits that are programmed to provide the functionality described herein. For example, one or more processors (e.g., microprocessor, microcontroller, central processing unit, etc.), configurable logic devices (e.g., CPLD (complex programmable logic device), FPGA (field programmable gate array), etc.), and/or other programmable integrated circuits can be programmed with software or other programming instructions to implement the functionality described herein. It is further noted that the software or other programming instructions can be stored in one or more non-transitory computer-readable mediums (e.g., memory storage devices, FLASH memory, DRAM memory, reprogrammable storage devices, hard drives, floppy disks, DVDs, CD-ROMs, etc.), and the software or other programming instructions when executed by the programmable integrated circuits cause the programmable integrated circuits to perform the processes, functions, and/or capabilities described herein.

Figure 6:
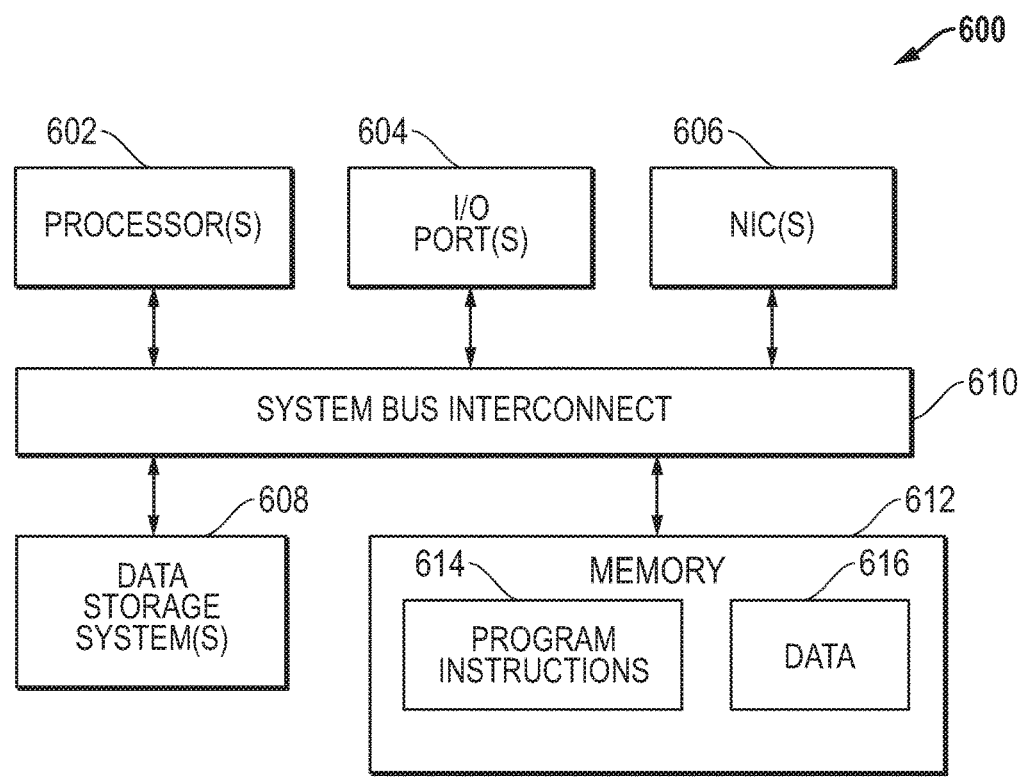
FIG. 6 is a block diagram of an example embodiment for a computing platform that can be used to implement one or more of the components described herein including controllers, servers in server zones, and/or other components.

FIG. 6 is a block diagram of an example embodiment for a computing platform 600 that can be used to implement one or more of the components described herein. The computing platform 600 includes one or more processors 602 or other programmable integrated circuit(s) that are programmed with code or logic instructions to perform the operations and functions described herein. In addition to processors 602 or other programmable integrated circuits, the computing platform 600 can also include one or more input/output (I/O) ports 604, one or more network interface cards (NICs) 606, one or more data storage systems 608, and memory 612 coupled to communicate with each other through a system bus interconnect 610. The memory 612 can include one or more memory devices that store instructions 614 and/or data 616 during operation of the computing platform 600. For example during operation, one or more of the processors 602 or other programmable integrated circuits can load software or program instructions stored in the data storage systems 608 into the memory 612 and then execute the software or program instructions to perform the operations and functions described herein. It is noted that the memory 612 and the data storage system(s) 608 can be implemented using any desired non-transitory tangible computer-readable medium, such as for example, one or more data storage devices, flash memories, random access memories, read only memories, programmable memory devices, reprogrammable storage devices, hard drives, floppy disks, DVDs, CD-ROMs, and/or any other non-transitory tangible computer-readable data storage mediums. It is further noted that the programmable integrated circuits can include one or more processors (e.g., central processing units (CPUs), controllers, microcontrollers, microprocessors, hardware accelerators, ASICs (application specific integrated circuit), and/or other integrated processing devices) and/or one or more programmable logic devices (e.g., CPLDs (complex programmable logic devices), FPGAs (field programmable gate arrays), PLAs (programmable logic array), reconfigurable logic circuits, and/or other integrated logic devices). Other variations and processing platforms can also be implemented while still taking advantage of the of the embodiments described herein.

Figure 7:
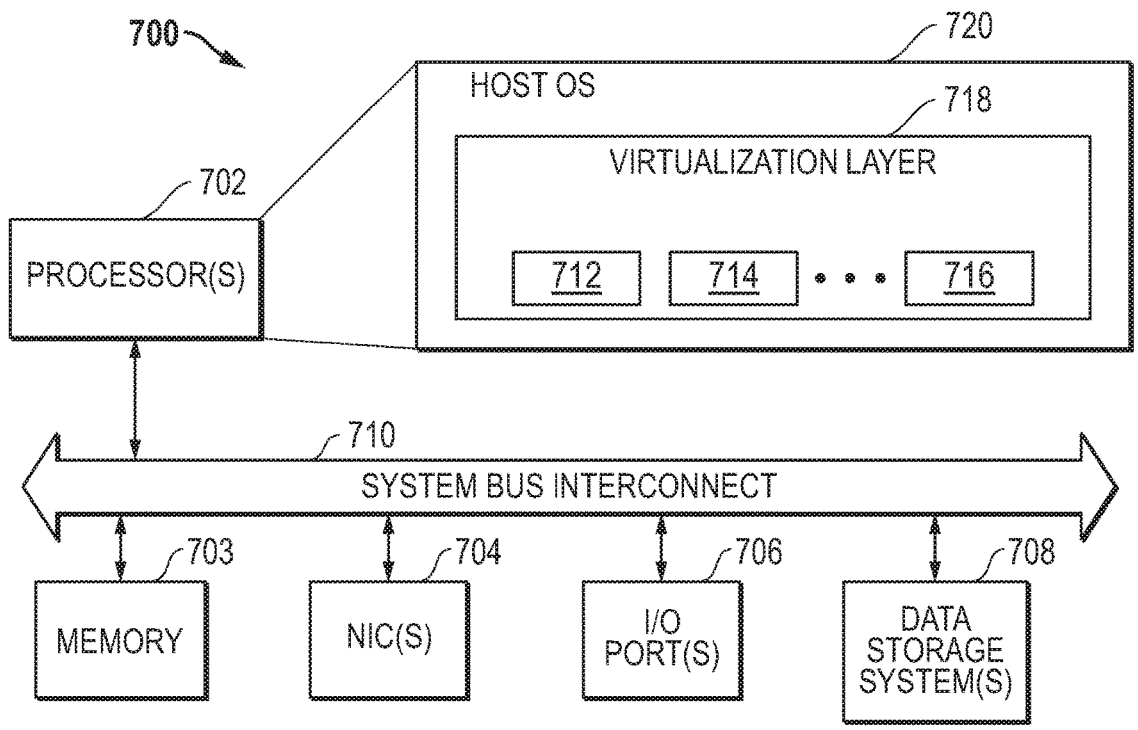
FIG. 7 is a block diagram of an example embodiment for a host server that can provide a virtual processing environment for virtual nodes and/or other virtual processing nodes.

FIG. 7 is a block diagram of an example embodiment 700 for a host server that can provide a virtual processing environment for virtual processing nodes described herein. For the example embodiment depicted, the host server 700 includes one or more processors 702 or other programmable integrated circuits that are programmed to provide a virtualization layer 718 (e.g., virtual machine hypervisor, container engine, etc.) for one or more virtual processing nodes 712, 714, . . . 716 that can implement one or more of the components described herein. The processors 702 or other programmable integrated circuit(s) can be programmed with software code or logic instructions stored in the data storage systems 708 to perform the operations and functions described herein. In addition to the processors 702 or other programmable integrated circuits, the host server 700 also includes one or more network interface cards (NICs) 704, one or more input/output (I/O) ports 706, one or more data storage systems 708, and memory 703 coupled to communicate with each other through a system bus interconnect 710. In operation, virtualization layer 718 and the virtual processing nodes 712, 714, . . . 716 run on top of a host operating system (OS) 720. For example, the host operating system 720, the virtualization layer 718, and the virtual nodes 712, 714, . . . 716 can be initialized, controlled, and operated by the processors or programmable integrated circuits 702 which load and execute software code and/or programming instructions stored in the data storage systems 708 to perform the functions described herein. The virtualization layer 718 for the virtual platforms can be implemented using any desired virtualization layer (e.g., hypervisor, container engine, etc.) that provides a virtual processing environment for the virtual processing nodes such as virtual machines (VMs) or instances. For one embodiment, the container engine can be implemented as a Docker container engine for a Linux operating system configured to execute Docker containers. Other variations could also be implemented.

It is noted that the memory 703 can include one or more memory devices that store program instructions and/or data used for operation of the host server 700. For example during operation, one or more of the processors 702 or other programmable integrated circuits can load software or program instructions stored in the data storage systems 708 into the memory 703 and then execute the software or program instructions to perform the operations and functions described herein. It is further noted that the data storage system(s) 708 and the memory 703 can be implemented using one or more non-transitory tangible computer-readable mediums, such as for example, data storage devices, FLASH memory devices, random access memory (RAM) devices, read only memory (ROM) devices, other programmable memory devices, reprogrammable storage devices, hard drives, floppy disks, DVDs, CD-ROMs, and/or other non-transitory data storage mediums. It is further noted that the programmable integrated circuits can include one or more processors (e.g., central processing units (CPUs), controllers, microcontrollers, microprocessors, hardware accelerators, ASICs (application specific integrated circuit), and/or other integrated processing devices) and/or one or more programmable logic devices (e.g., CPLDs (complex programmable logic devices), FPGAs (field programmable gate arrays), PLAs (programmable logic array), reconfigurable logic circuits, and/or other integrated logic devices). Other variations and processing or computing platforms can also be implemented while still taking advantage of the of the embodiments described herein.

It is further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the of the embodiments described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A system to distribute session-based network traffic to network tools, comprising:
    one or more distributors, a plurality of ingress processors, and plurality of egress processors operating within a virtual processing environment hosted by one or more servers to forward session-based network traffic to one or more network tools; and
    one or more session controllers operating within the virtual processing environment to dynamically control numbers of virtual processing nodes within the virtual processing environment operating as the one or more distributors, the plurality of ingress processors, and the plurality of egress processors;
    wherein the session-based network traffic comprises user packets and control packets associated with user sessions for a plurality of users;
    wherein the distributors, the ingress processors, and the egress processors but not the session controllers further operate to process and distribute the user packets; and
    wherein the distributors, the session controllers, and the egress processors but not the ingress processors further operate to process and distribute the control packets.

2. The system of claim 1, wherein the one or more distributors further operate to:
    receive the control packets and the user packets;
    forward the control packets to the one or more session controllers; and
    distribute the user packets among the ingress processors;
    wherein the ingress processors further operate to:
    receive the user packets from the one or more distributors; and
    forward the user packets to egress processors;
    wherein the one or more session controllers further operate to:
    receive the control packets from the one or more distributors;
    correlate the control packets with the user sessions; and
    forward the correlated control packets to the egress processors; and
    wherein the egress processors further operate to:
    receive the user packets from the ingress processors;
    receive the correlated control packets from the one or more session controllers;
    aggregate the user packets and the correlated control packets to form aggregated packets; and
    forward the aggregated packets to one or more network tools based upon tool forwarding instructions.

3. The system of claim 2, wherein the one or more session controllers further operate to forward egress forwarding instructions to the ingress processors to determine how user packets are forwarded from the ingress processors to the egress processors and to forward tool forwarding instructions to the egress processors to determine how the user packets and correlate control packets are forwarded from the egress processors to the one or more network tools.

4. The system of claim 3, wherein the one or more session controllers further operate to allow configuration of the egress forwarding instructions and the tool forwarding instructions through a user interface.

5. The system of claim 3, wherein the egress forwarding instructions are to forward user packets associated with a particular user to a common egress processor, the common egress processor aggregating user packets and correlated control packets for the particular user.

6. The system of claim 2, wherein the one or more distributors further operate to generate hash values based upon one or more parameters extracted from the user packets and to distribute the user packets among the ingress processors based upon the hash values.

7. The system of claim 2, wherein the one or more session controllers further operate to forward instructions to the one or more distributors to determine which ingress processor receives each user packet.

8. The system of claim 2, wherein the session-based network traffic comprises GTP (GPRS (General Packet Radio Service) Tunneling Protocol) traffic, wherein the control packets comprise GTP-C packets, and wherein the user packets comprise GTP-U packets.

9. The system of claim 8, wherein the one or more distributors further operate to extract a TEID (tunnel endpoint identifier) from the user packets and to distribute the user packets among the ingress processors based upon the TEIDs.

10. The system of claim 2, wherein the one or more session controllers further operate to send information to the one or more distributors identifying a number of ingress processors operating in the virtual processing environment, and wherein the one or more distributors further operate to use the number of ingress processors to distribute the user packets among the ingress processors.

11. The system of claim 2, wherein the egress processors comprise initial egress processors and secondary egress processors, the initial egress processors forwarding the aggregated packets to the secondary egress processors based upon secondary egress forwarding instructions, and the secondary egress processors receiving the tool forwarding instructions.

12. The system of claim 11, wherein the secondary egress processors further operate to group the aggregated packets based upon one or more packet identifiers and to forward the grouped aggregated packets to the one or more network tools based upon the tool forwarding instructions.

13. The system of claim 12, wherein the one or more packet identifiers comprise information extracted from at least one of the user packets or the control packets.

14. The system of claim 13, wherein the one or more packet identifiers comprise at least one of an APN (access point name) identifier, a network address identifier, or an application identifier.

15. A method to distribute session-based network traffic to network tools, comprising:
operating one or more distributors, a plurality of ingress processors, and plurality of egress processors within a virtual processing environment hosted by one or more servers to forward session-based network traffic to one or more network tools, the session-based network traffic comprising user packets and control packets associated with user sessions for a plurality of users; and
operating one or more session controllers within the virtual processing environment to dynamically control numbers of virtual processing nodes within the virtual processing environment operating as the one or more distributors, the plurality of ingress processors, and the plurality of egress processors;
wherein the method further comprises:
processing and distributing the user packets with the distributors, the ingress processors, and the egress processors but not the session controllers; and
processing and distributing the control packets with the distributors, the session controllers, and the egress processors but not the ingress processors.

16. The method of claim 15, wherein the method comprises:
with the one or more distributors:
receiving the control packets and the user packets;
forwarding the control packets to the one or more session controllers; and
distributing the user packets among the ingress processors;
with the ingress processors:
receiving the user packets from the one or more distributors; and
forwarding the user packets to egress processors;
with the one or more session controllers:
receiving the control packets from the one or more distributors;
correlating the control packets with the user sessions; and
forwarding the correlated control packets to the egress processors; and
with the egress processors:
receiving the user packets from the ingress processors;
receiving the correlated control packets from the one or more session controllers;
aggregating the user packets and the correlated control packets to form aggregated packets; and
forwarding the aggregated packets to one or more network tools based upon tool forwarding instructions.

17. The method of claim 16, wherein the method further comprises with the one or more session controllers:
forwarding egress forwarding instructions to the ingress processors to determine how user packets are forwarded from the ingress processors to the egress processors; and
forwarding tool forwarding instructions to the egress processors to determine how the user packets and correlate control packets are forwarded from the egress processors to the one or more network tools.

18. The method of claim 17, wherein the egress forwarding instructions are to forward user packets associated with a particular user to a common egress processor, and wherein the common egress processor aggregates user packets and correlated control packets for the particular user.

19. The method of claim 16, wherein the session-based network traffic comprises GTP (GPRS (General Packet Radio Service) Tunneling Protocol) traffic, wherein the control packets comprise GTP-C packets, and wherein the user packets comprise GTP-U packets.

20. The method of claim 16, wherein the egress processors comprise initial egress processors and secondary egress processors, and wherein the method further comprises:

with the initial egress processors, forwarding the aggregated packets to the secondary egress processors based upon secondary egress forwarding instructions; and with the secondary egress processors, grouping the aggregated packets based upon one or more packet identifiers and forwarding the grouped aggregated packets to the one or more network tools based upon the tool forwarding instructions.

* * * * *